United States Patent [19]

Yamamoto et al.

[11] Patent Number: 5,540,415
[45] Date of Patent: Jul. 30, 1996

[54] STEAM ISOLATION VALVE

[75] Inventors: Tetsuzo Yamamoto, Yokohama; Katsumi Yamada, Fujisawa, both of Japan

[73] Assignee: Kabushiki Kaisha Toshiba, Kawasaki, Japan

[21] Appl. No.: 292,274

[22] Filed: Aug. 18, 1994

[30] Foreign Application Priority Data

Aug. 27, 1993 [JP] Japan .................................. 5-212987

[51] Int. Cl.⁶ .................................................. F16K 1/00
[52] U.S. Cl. ............................ 251/324; 251/118; 251/123
[58] Field of Search .................................. 251/118, 123, 251/318, 324

[56] References Cited

U.S. PATENT DOCUMENTS 2,685,426  8/1954  MacGregor .......................... 251/118

FOREIGN PATENT DOCUMENTS 559903  3/1957  Italy ...................................... 251/324

OTHER PUBLICATIONS

H. Richter, "Rohrhydraulik", p. 274, (1958), Germany.
A. H. Gibson, "Hydraulics and its Applications", pp. 87–89, (1919), London.

Primary Examiner—John C. Fox
Attorney, Agent, or Firm—Foley & Lardner

[57] ABSTRACT

A steam isolation valve system for opening and closing a steam flow passage of a steam flow comprises a valve body, a valve disk accommodated in the valve body to be reciprocatingly movable for opening and closing the steam flow passage, and a drive mechanism for moving the valve disk along an axial direction of the valve body. The steam flow passage has a portion elliptical in section having a short axis in a direction of the reciprocating axis of the valve disk projected on a plane perpendicular to an axis of the steam flow passage. The steam flow passage has a throttling inlet passage which is deformed in shape from a circular tube portion having a diameter D on a steam upstream side to an elliptical tube portion having a long side diameter D and a short side diameter D cosθ (45°≦θ≦65°) on a steam downstream side, an intermediate passage which has an elliptical shape of the same diameters as that of the elliptical tube portion of the inlet passage and to which is connected a tube in which the valve disk is reciprocated with an inclination θ with respect to the axis of the steam flow line, and enlarging outlet passage which is deformed in shape from an elliptical tube portion having the same diameter as that of the elliptical tube portion of the intermediate passage at a steam upstream side to a circular portion having a diameter D at a steam downstream side.

15 Claims, 13 Drawing Sheets

STEAM ISOLATION VALVE

BACKGROUND OF THE INVENTION

The present invention relates to a steam isolation valve system, and more particularly, to a main steam isolation valve for a boiling water reactor capable of making smooth steam flow in a valve system in the boiling water reactor.

Generally, in a boiling water reactor (BWR), as shown in FIG. 13, a reactor pressure vessel 1 located in a reactor containment vessel 4 is connected to a steam turbine 3 through a plurality of, for example, four, main steam lines 2, and the respective main steam lines 2 are provided with first and second main steam isolation valves 5 and 6, respectively, in an arrangement in which the first steam isolation valves 5 are disposed inside the reactor containment vessel 4 and the second steam isolation valves 6 are disposed outside the reactor containment vessel 4. Accordingly, the reactor pressure vessel 1 can be isolated as occasion demands by closing these main steam isolation valves 5 and 6.

The steam after working in the steam turbine 3 is then condensed in a condenser 7, and thereafter, the thus condensed water is returned to the reactor pressure vessel 1 through a water supply system 8. As shown in FIG. 13, Venturi tubes 19 are provided for the main steam lines 2, and third main steam valves 9 are also provided for the main steam lines 2. A reference numeral 10 denotes a header.

Next, with reference to FIG. 14, each of the main steam isolation valves 5 (6) has a valve body 11 provided with steam inlet side portion 11a and steam outlet side portion 11b which are connected with each of the main steam lines 2, and the valve body 11 is further provided with a valve disk accommodation portion 11c in which a valve disk 12 of a bottomed cylindrical structure is accommodated in a manner slidable in its axial direction.

The valve disk 12 has an inclination of about 45°, for example, with respect to the flowing direction of the steam as shown by arrows to reduce flow resistance. The main steam isolation valve 5 (6) is provided with a driving device 14 to which a drive shaft 13 is connected at its one end and the other end of the drive shaft 13 is connected to the valve disk 12 so that the valve disk opens or closes the steam flow passage by axially reciprocating the valve disk 12 by the operation of the driving device 14. The driving device 14 is mounted to the bonnet 17 by a Yoke Rod 18. The driving device 14 is composed of an air cylinder 14a, an oil cylinder 14b, outer springs 14c, a spring seat 14d and a coupling 14e.

When the valve disk 12 is lowered and abuts against a valve seat 16, the steam flow passage is fully closed and conversely, when the valve disk 12 is lifted as shown in FIG. 14, a valve port is fully opened. In the fully opened state, the valve disk 12 is positioned at a portion at which a valve bottom of the valve disk 12 is positioned to a portion to half close the inlet side portion 11a of the valve body 11 for reducing a moving stroke thereof between the fully opened position to the fully closed position of the valve disk 12.

In order to ensure the position of the valve seat 16, a line axis of the flow passage of the inlet side portion 11a is shifted from the same direction as the line axis of the main steam line 2 to a direction perpendicular to the axis of the valve disk 12 as approaching the valve seat 16. On the other hand, a line axis of the flow passage of the outlet side portion 11b, directing from the valve seat 16 to the outlet, is shifted from substantially the same direction of the axis of the valve disk 12 at the valve seat 16 to the axis direction of the main steam line 2 as approaching the outlet. Accordingly, the flow path changes its direction in three curved portions and throttled at the valve seat 16.

According to the conventional structure of the main steam isolation valve 5 (6) described above, the steam flow from the inlet side portion 11a is rapidly bent or curved at the inlet side flow passage, and at the portion between the valve disk bottom and the valve seat 16, then throttled and flows as a jet flow into the flow passage of the outlet side portion 11b, after which the steam flow is gradually enlarged. As this result, a vortex current of the steam will be caused around the jet flow at the bottom portion of the valve disk 12 and the valve seat side of a duct of the outlet side portion 12b, and a relatively large turbulence is caused in comparison with a case of a straight steam line axis including no curved portion.

According to the steam flow condition described above with respect to the conventional main steam isolation valve, pressure loss is caused due to the curving of the flow passage, the rapid throttling thereof, and the rapid enlargement thereof in the first and second main steam isolation valves 5 and 6. The pressure loss reduces the steam energy working for the turbine. Accordingly, it will be said that plant operational efficiency can be improved by reducing the pressure loss of the first and second main steam isolation valves.

Further, the steam flow turbulence causes flow-induced vibration of the valve disk 12, which may cause wear or damage to the valve disk 12, the valve shaft 13 and structural members contacting thereto such as inlet guide rib 15. Such problem or inconvenience damaging soundness of the plant structure will be likely caused to machineries or mechanisms such as valves, for example, the third main steam valves 9, disposed downstream side of the steam flow.

SUMMARY OF THE INVENTION

An object of the present invention is to substantially eliminate defects or drawbacks encountered in the prior art described above and to provide a steam isolation valve system capable of significantly realizing a smooth fluid, i.e. steam, flow in a steam flow line (or tube) of the steam isolation valve system to thereby effectively reducing pressure loss caused in the valve system and also reducing generation of a turbulent steam flow in the steam flow passage.

This and other objects can be achieved by the present invention by providing a steam isolation valve system for opening and closing a steam flow passage in a steam flow line comprising:

a valve body;

a valve disk accommodated in the valve body so as to carry out a reciprocal motion in the valve body for opening and closing the steam flow passage; and a drive means for reciprocatingly moving the valve disk along an axial direction of the valve body, wherein the steam flow passage has a portion elliptical in section having a short axis in a direction of the reciprocating axis of the valve disk projected on a plane perpendicular to an axis of the steam flow line.

In a preferred embodiment, the steam flow passage has a throttling inlet passage portion which is deformed in shape from a substantially circular tube portion having a diameter D on a steam upstream side to an elliptical tube portion having a long side diameter D and a short side diameter D cosθ (45°≦θ≦65°) on a steam downstream side, an intermediate passage portion which has an elliptical shape of the same diameters of the elliptical tube portion of the inlet passage portion and to which is connected a tube in which the valve disk is moved in a reciprocal manner with an inclination θ with respect to the flow passage axis, and enlarging outlet passage portion which is deformed in shape from an elliptical tube portion having the same diameter as that of the elliptical tube portion of the intermediate passage portion at a steam upstream side to a substantially circular tube portion having a diameter D at a steam downstream side.

In further preferred embodiments or modifications, a ratio (M) of a tube length (L2) of the enlarging outlet passage portion excluding a straight tube portion with respect to a tube length (L1) of the throttling inlet passage portion excluding a straight tube portion is satisfied with a range of 1<M≦12.5.

The enlarging outlet passage portion has an inner surface shape satisfying an equation of $d(w^2)/dz=c$, in which w is the velocity in an axial direction of the enlarging outlet passage averaged at the cross section, z is a positional coordinate in the axial direction and c is constant. The throttling inlet passage portion has an inner surface shape satisfying an equation of $d(w^2)/dz=c$, in which w is an average velocity in an axial direction of the throttling inlet passage portion, z is a positional coordinate in the axial direction and c is constant.

The steam flow passage line (tube) is provided with a flow return passage having one end opened to a downstream side end of the intermediate flow passage portion and another end opened to a portion in the vicinity of a wall portion at which the steam flow in the enlarging outlet passage portion is separated from the wall.

A plurality of circumferential grooves are formed to an inner surface of a tube wall of the steam flow line constituting the enlarging outlet passage portion, each of the grooves having a depth in a direction from perpendicular to the axis of the steam flow line to perpendicular to the wall surface, and extending in a circumferential direction of the elliptical inner surface of the tube wall.

The valve disk is positioned entirely outside the elliptical intermediate passage portion when a valve fully opened.

A plurality of grooves are formed to inner wall surfaces of the throttling inlet passage portion, the intermediate passage portion and the enlarging outlet passage portion and an outer surface of the valve disk, respectively, each of the grooves having a depth and a width substantially corresponding to a thickness of a turbulent flow boundary layer and extending along a steam line in the vicinity of each of the wall surfaces.

The steam flow line has a differential pressure meter which measures the differential pressure between the inlet duct portion and the intermediate passage portion.

Wall structures constituting a corner portion at a start portion of the throttling inlet passage portion and a corner portion at an end portion of the enlarging outlet passage portion are provided with curved surfaces, respectively, to make the surfaces smooth.

A guide rib means is provided to an inlet portion of the intermediate passage portion, and side guide rib means is provided to the valve disk so as to extend axially thereof.

A reinforcing rib means is formed to an outer surface of the valve body at which the throttling inlet passage portion, the intermediate passage portion and the enlarging outlet passage portion are positioned.

The valve disk has a bottom portion of a protruded spherical shape.

The valve disk has a bottom portion having an axially asymmetric structure occupying a space between the elliptical passage and the bottom portion of the valve disk in a valve fully opened state. The valve body has a thickness capable of preventing a valve seat from being thermally deformed and deformed by reaction force of the piping system.

According to the above preferred embodiments or modifications of the present invention, in the generic aspect, the ratio of the area of the valve disk, which is exposed to the steam flow in the intermediate passage having an elliptical cross section having the short axis in the direction of the valve axis of the valve disk projected on a plane perpendicular to the steam flow line axis, is made small, and furthermore, a enlarged flow area can be ensured in the long axis direction. According to this structure, generation of vortex flow due to the wake of the valve disk caused by the exposure of the valve disk to the steam flow can be significantly reduced. Furthermore, the friction resistance of the steam flow caused by the increasing of the flow velocity through the throttling of the flow in the vicinity of the bottom of the valve disk can be also reduced. Accordingly, as a result, the pressure loss in the main steam isolation valve and the generation of the turbulence in the steam flow can be significantly reduced.

In the preferred structure, the steam flow line (tube) of the steam isolation valve comprises three passage portions, that is, the throttling inlet passage, the intermediate passage and the enlarging outlet passage, which have different steam flow cross sections and have the steam flow axes on the same straight line. According to such structure of the steam flow line, the main steam flow can be made smooth without being curved and flows gently while being throttled and enlarged. Accordingly, as a result, the pressure loss in the main steam isolation valve and the generation of the turbulence in the steam flow can be significantly reduced, which cannot be attained in a structure of a conventional steam isolation valve.

In further preferred structures, in one aspect, the length L2 of the enlarging outlet passage at which the flow separation is likely caused is made relatively large with respect to the length L1 of the throttling inlet passage, thus significantly eliminating the causing of the vortex. The ratio L2/L1 can be effectively set as mentioned above.

The enlarging outlet passage has na enlarging inner shape towards the downstream direction having an inner surface shape satisfying an equation of $d(w^2)/dz=c$, in which w is the velocity in an axial direction of the enlarging outlet passage averaged at the cross section, z is a positional coordinate in the axial direction and c is constant. Further, since $d(w^2)/dz \propto -(dp/dz)$ (p: average pressure at tube cross section), the pressure is constantly increased in the enlarging outlet passage. Accordingly, the pressure cannot be rapidly increased at any portion in the enlarging outlet passage, which is less likely to cause the flow separation phenomenon.

On the other hand, in another aspect, the throttling inlet passage has an inner surface shape, bellmouth shape, satisfying an equation of $d(w^2)/dz=c$, in which w is the velocity in an axial direction of the throttling inlet passage averaged at the cross section, z is a positional coordinate in the axial direction and c is constant. Accordingly, the main steam flow is reduced in its pressure with a constant pressure gradient and flows into the intermediate passage smoothly, whereby, likely in the case of the above mentioned enlarging outlet passage shape, the pressure loss in the main steam isolation valve and the generation of the turbulence in the steam flow can be significantly reduced.

The formation of the return passage connecting the down stream portion of the intermediate flow passage and the enlarging outlet passage accelerates the fluid in the flow velocity boundary layer, which prevents flow separation in the enlarging outlet passage, and hence, the generation of the vortex therein.

The formation of the grooves to the inner wall surface of the enlarging outlet passage for promoting the turbulence to mix the main steam flow with the steam flow in the flow velocity boundary layer to thereby easily transfer the momentum of the main steam flow to the steam flow in the velocity boundary layer. As a result, the flow separation of the main steam flow in the outlet passage can be significantly reduced and a large vortex can be also prevented, whereby the pressure loss in the main steam isolation valve and the generation of the turbulence in the steam flow can be significantly reduced.

The further natures, features and functions of the present invention achieved by the above and further preferred embodiments will be described hereunder with reference to the accompanying drawings.

According to the respective embodiments and their modifications, the pressure loss in the main steam isolation valve can be significantly reduced, and the turbulence in the steam flow can be also reduced, which result in the reduction of the hydrodynamic energy loss, thus improving the operational efficiency of a plant such as a reactor power plant.

BRIEF DESCRIPTION OF THE DRAWINGS

In the accompanying drawings:

FIGS. 1A–1D is a sectional views of a first embodiment of a steam isolation valve according to the present invention, in which FIG. 1A is a sectional view of the steam isolation valve and FIGS. 1B, 1C and 1D are views showing sections of the steam flow passage at portions Ia, Ib and Ic in FIG. 1A;

FIGS. 6A and 6B are sectional views of a fifth embodiment of a steam isolation valve according to the present invention, in which FIG. 6A is a sectional view of the steam isolation valve and FIG. 6B is a sectional view taken along the line VIB-VIB in FIG. 6A;

FIGS. 7A and 7B are sectional views of a sixth embodiment of a steam isolation valve according to the present invention, in which FIG. 7A is a sectional view of the steam isolation valve and FIG. 7B is a view of a steam flow passage in the axial direction thereof described in a perspective manner;

FIGS. 8A and 8B are sectional views of a seventh embodiment of a steam isolation valve according to the present invention, in which FIG. 8A is a sectional view of the steam isolation valve and FIG. 8B is a correlation curve graph to get the steam flow rate from the differential pressure meter output of the steam isolation valve system in FIG. 8A;

FIGS. 9A–9C are a sectional views of an eighth embodiment of a steam isolation valve according to the present invention, in which FIG. 9A is a sectional view of the steam isolation valve and FIGS. 9B and 9C are views showing portions B and C in enlarged scales;

FIGS. 10A and 10B are sectional views of a ninth embodiment of a steam isolation valve according to the present invention, in which FIG. 10A is a sectional view of the steam isolation valve and FIG. 10B is a sectional view taken along the line XB-XB in FIG. 10A;

FIGS. 11A and 11B are sectional views of a tenth embodiment of a steam isolation valve according to the present invention, in which FIG. 11A is a sectional view of the steam isolation valve and FIG. 11B is a sectional view taken along the line XIB—XIB in FIG. 11A;

DESCRIPTION OF THE PREFERRED EMBODIMENTS

Figure 1A:
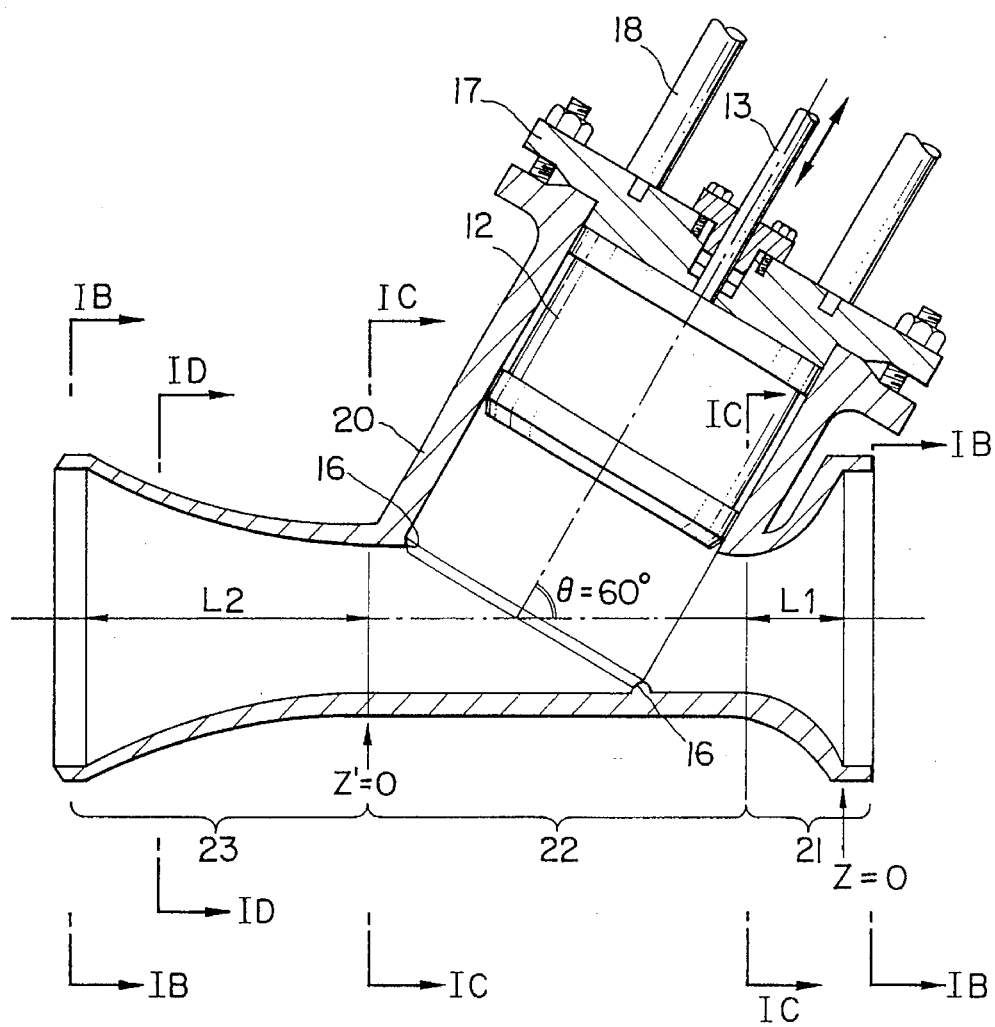

Various preferred embodiments of the main steam isolation valves according to the present invention will be described hereunder with reference to FIGS. 1 to 12, in which like reference numerals are added to members or portions corresponding to those shown in FIGS. 13 and 14 and the detailed description thereof will be hence omitted herein.

Figure 1B:
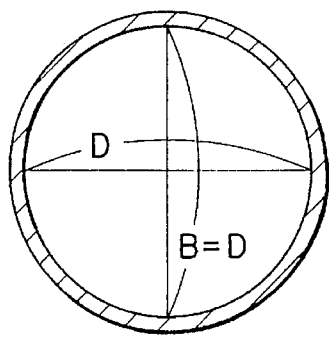
Figure 1C:
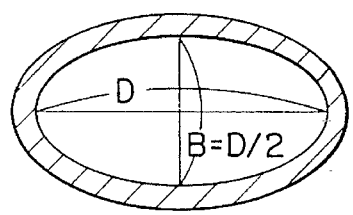
Figure 1D:
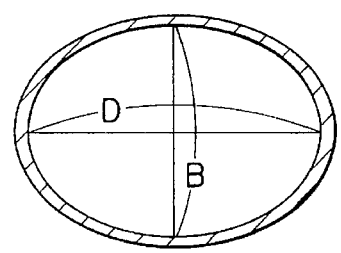

FIG. 1 including FIGS. 1A, 1B, 1C and 1D, represents a first embodiment according to the present invention, in which FIG. 1A shows a structure of a main steam isolation valve having a valve disk 12 capable of reciprocating with an inclination $\theta$ of 60°, for example, with respect to line axes of throttling inlet flow passage 21, intermediate flow passage 22 and enlarging outlet flow passage 23 of a valve body. FIGS. 1B, 1C and 1D show cross sections of the flow passages viewed from arrowed direction at portions Ia, Ib and Ic, respectively, in FIG. 1A.

These flow passages are continuous and the inlet throttling inlet passage 21 is throttled from a circular tube having a diameter D to an elliptical tube having a long diameter D and a short diameter B (=D/2). The intermediate passage 22 is an elliptical flow passage thus throttled having long and short diameters D and D/2, and the enlarging outlet passage 23 is a flow passage which is enlarged to the intermediate throttled flow passage to the circular flow passage having a diameter D.

A ratio M of the longitudinal length of the enlarging outlet passage 23 with respect to that of the throttling inlet passage 21 will be determined to be M=3, for example. The short diameters of the elliptical shapes of the cross sections of the throttling inlet flow passage 21 and the enlarging outlet flow passage 23 changed so as to satisfy the following equation (1).

$$d(w^2)/dz = c \tag{1}$$

in which w: flow velocity in the axial direction of the tube (line) averaged at the cross section (w=Q/A, Q: volume flow rate, A: flow area (=π DB/4))

z: position coordinate in the axial direction of the tube (line)

c: constant

In this case, the large diameter D of the elliptical shape of the throttling inlet flow passage is made constant and the short diameter B thereof is shown by the following equation.

$$B=D/(1+(1/\cos^2\theta-1)\times Z/L1)^{1/2}$$

in which $\theta=60°$ in the case of FIG. 1

L1: length of throttling inlet flow passage excluding straight tube portion

Z: position in tube axial direction (throttled portion starts at Z=0)

Also, in this case, the large diameter D of the elliptical shape of the enlarging outlet flow passage is made constant and the short diameter B thereof is shown by the following equation.

$$B=D/((1-1/\cos^2\theta)\times Z'/L2+1/\cos^2\theta)^{1/2}$$

in which $\theta=60°$ in the case of FIG. 1

L2: length of enlarging outlet flow passage excluding straight tube portion

Z': position in tube axial direction (enlarged portion starts at Z'=0)

With reference to FIG. 1A, the valve disk 12 is in fully opened position of the valve, in which the valve disk 12 is positioned outside the elliptical flow passage of the intermediate flow passage 22 so that the main steam flow does not directly collide with the valve disk 12.

According to the structure of the steam isolation valve of FIG. 1, the steam from the main steam line 2 is smoothly throttled in the throttling inlet flow passage 21 and enters and passes the intermediate flow passage 22 without being obstructed by the valve disk 12, and then flows through the enlarging outlet flow passage 23 without flow separation from the passage wall, and flows out from the main steam isolation valve 5(6). As a result, the reduction of the pressure loss and the turbulence flow in the main steam isolation valve can be prevented. The flow separation described herein means a phenomenon that a fluid in a flow velocity boundary layer, in which the fluid momentum is made small by the friction to the tube wall surface, starts to flow separation by a severe increasing of the pressure. The generation of the flow separation will likely cause the generation of vortex flow. The term "fluid" is used herein with substantially the same meaning as that of the term "steam".

In the case of $\theta$ being less than 45°, the stroke length of the valve disk is equal or larger than the long diameter D and the length, i.e. height, of the valve disk driving mechanism is made high in position, thus being inconvenient for aseismis design and the valve maintenance. Conversely, in the case of $\theta$ being larger than 65°, the pressure loss cannot be significantly reduced.

Figure 2:
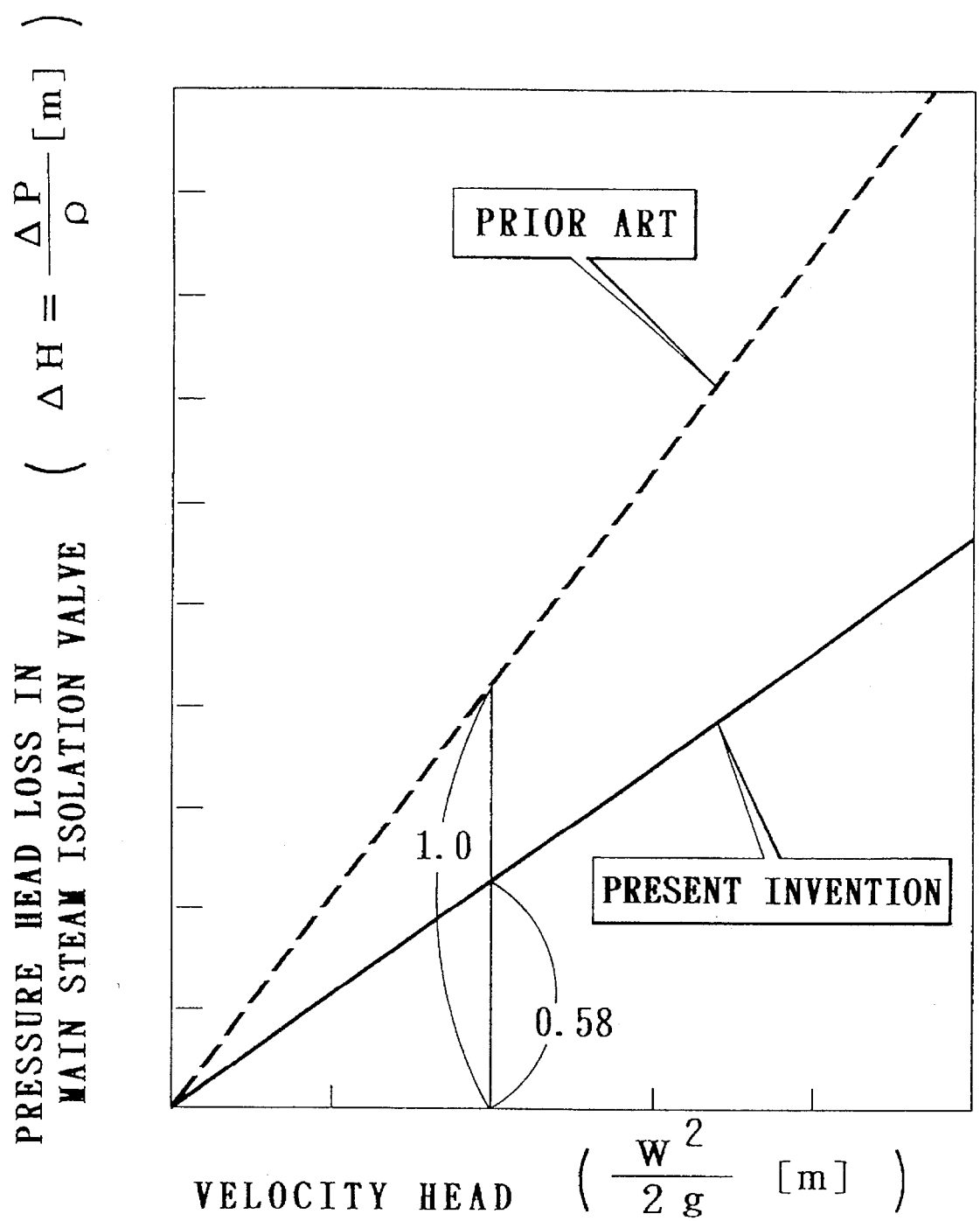
FIG. 2 is a diagram showing a comparison of pressure losses in the steam isolation valve of FIG. 1 with a conventional steam isolation valve of FIG. 14.
Figure 14:
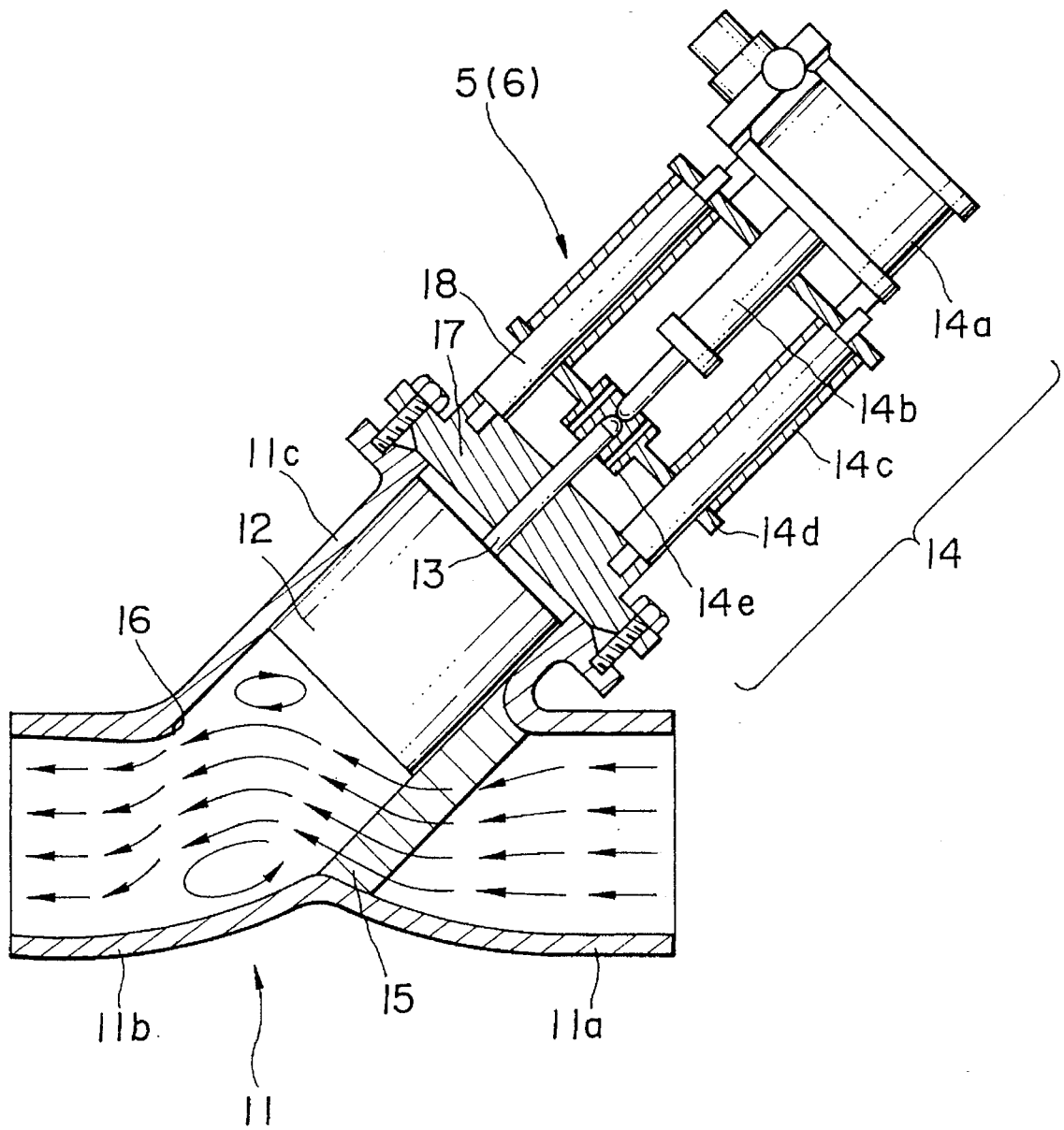
FIG. 14 is a sectional view showing a structure of a conventional steam isolation valve.

FIG. 2 is a graph based on an experiment for comparison of the pressure loss in a flow passage model of the main steam isolation valve shown in FIG. 1 with that of the conventional main steam isolation valve shown in FIG. 14. Referring to FIG. 2, an axis of abscissa represents a velocity head of a fluid and an axis of ordinate represents a pressure loss head in the main steam isolation valve, and an inclination of the graph represents the pressure loss coefficient. According to this experiment, it is found that the pressure loss in the present main steam isolation valve of FIG. 1 can be reduced to about 60% of the pressure loss in the conventional main steam isolation valve of FIG. 14.

Figure 3:
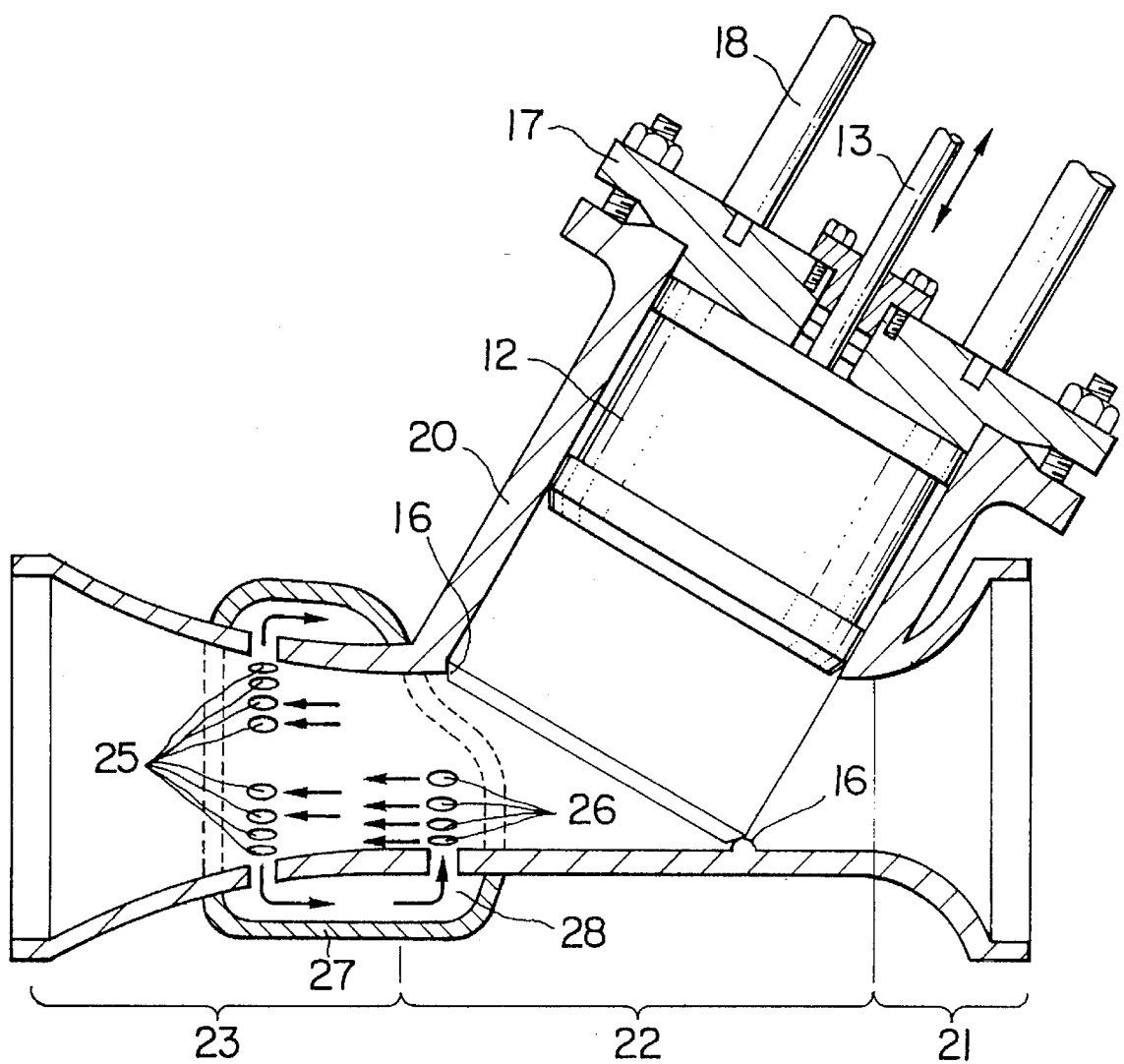
FIG. 3 is a sectional view similar to that of FIG. 1A of a second embodiment of a steam isolation valve according to the present invention.

FIG. 3 shows a view similar to that of FIG. 1A but representing a second embodiment of a main steam isolation valve according to the present invention.

Referring to the second embodiment of FIG. 3, a fluid, i.e. steam, in a velocity boundary layer near a breakaway point at the enlarging outlet passage 23 is sucked into a suction hole 25 formed to the fluid passage line (tube), then flows through the flow return passage 28 defined between the wall of the main flow passage and the covering wall around the wall of the main flow passage, and returns to the main flow passage through a return hole 26.

In a view point of effective function, the suction hole 25 will be formed at a portion near a portion at which the flow separation is likely caused at a portion downstream side of the intermediate passage at which the pressure head is most reduced and the return hole 26 will be formed.

In an alternation, the flow return structure may be formed, in place of the location of the flow return passage forming wall structure 27, by a pipe means connecting the suction hole 25 and the return hole 26.

According to the structure of the second embodiment, the fluid passing in the velocity boundary layer in the enlarging outlet flow passage 23 can be sucked by means of the flow return passage 28, thus preventing the flow separation and the vortex caused thereby, whereby the pressure loss in the main steam isolation valve can be reduced and the generation of turbulence can be also reduced.

Figure 4:
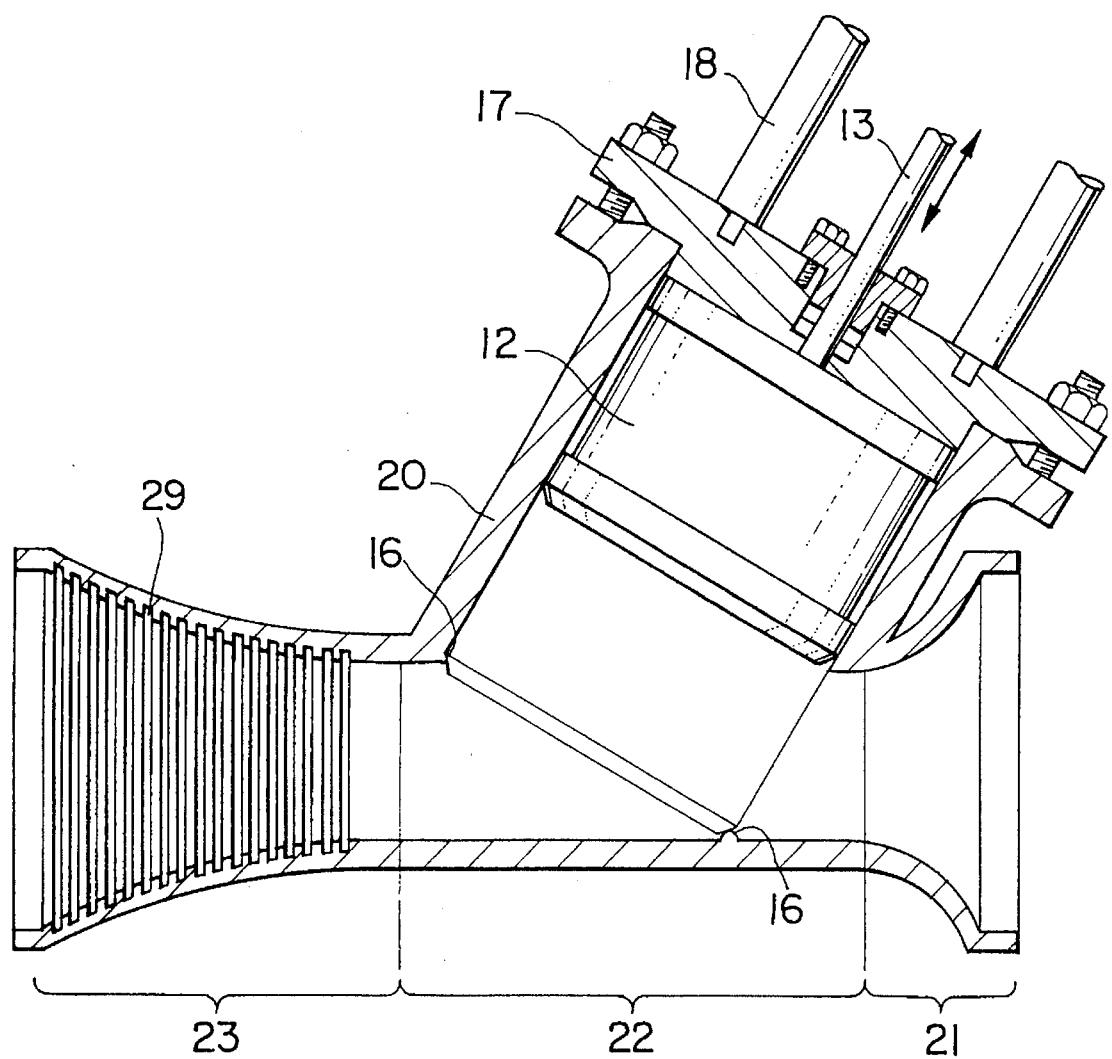
FIG. 4 is a sectional view similar to that of FIG. 1A of a third embodiment of a steam isolation valve according to the present invention.

FIG. 4 shows a view similar to that of FIG. 1A or 3 but representing a third embodiment of a main steam isolation valve according to the present invention.

Referring to FIG. 4, the enlarging outlet flow passage 23 in the flow passage line has an inner wall structure, elliptical in section, formed with a plurality of elliptical grooves 29 as turbulence promoting means each having a depth in the radial direction of the flow passage and a length along the circumferential direction of the elliptical wall structure.

According to the grooved structure of the enlarging outlet flow passage 23 of this embodiment, the main fluid (steam) flow is mixed with the fluid in the velocity boundary layer to thereby easily transfer the momentum of the main flow into the velocity boundary layer. As a result, the separation of the main steam flow can be effectively suppressed and large vortex can be hence prevented from causing though small vortex is caused, resulting in the reduction of the pressure loss in the main steam isolation valve and the reduction of the turbulence generation in the flow.

Figure 5:
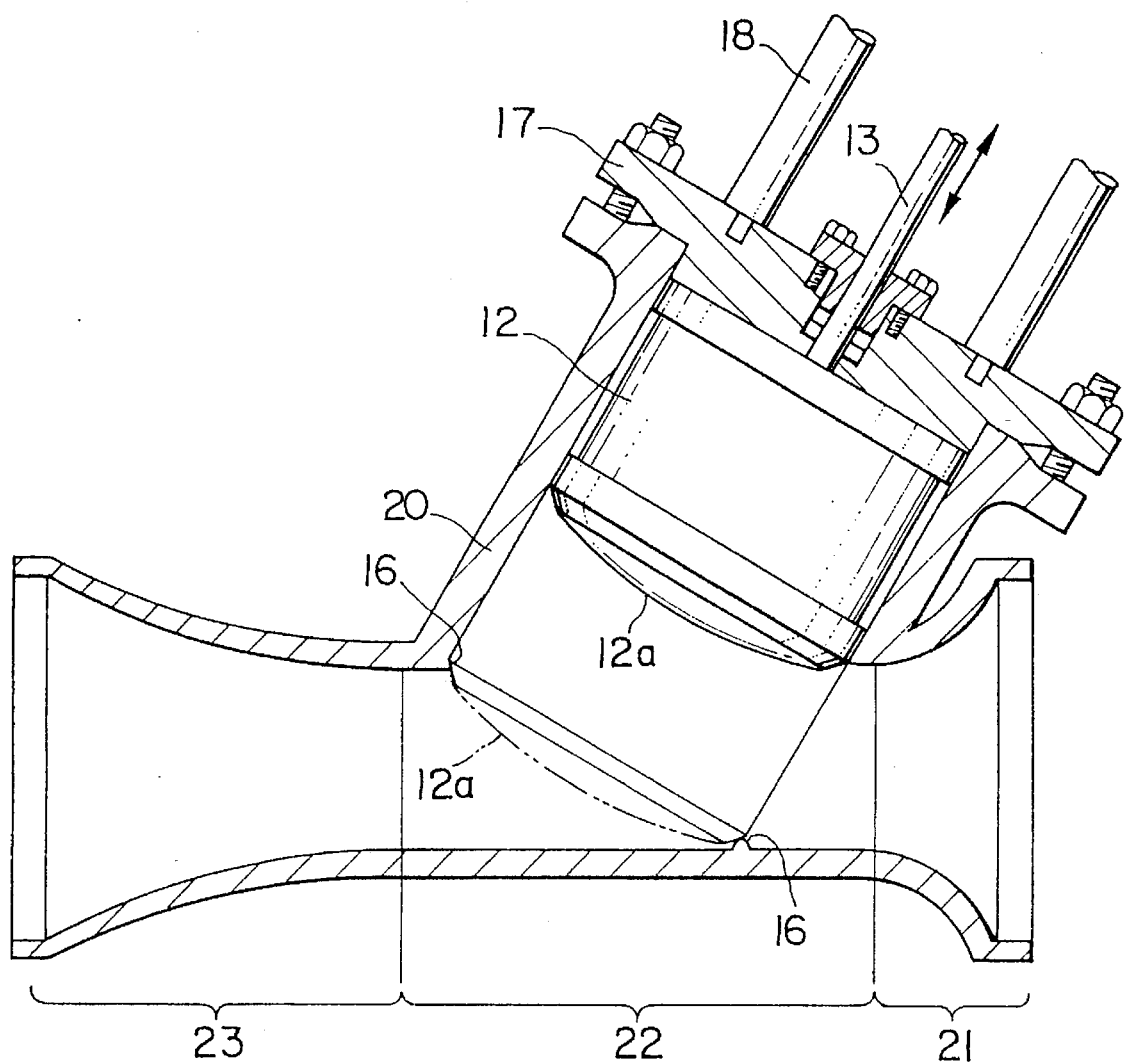
FIG. 5 is a sectional view similar to that of FIG. 1A of a fourth embodiment of a steam isolation valve according to the present invention.

FIG. 5 shows a view similar to that of each former embodiment but representing a fourth embodiment of a main steam isolation valve according to the present invention.

Referring to FIG. 5, the valve disk 12 for opening or closing the flow passage has a structure such that it is positioned outside the elliptical flow passage of the intermediate flow passage 22 so that the main flow does not 10 directly collide with the valve disk 12 in the fully opened position of the valve, and the valve disk 12 has an outwardly curved shape 12a at the bottom.

According to the structure of the fourth embodiment, vortex and turbulence in the wake of the valve disk 12 caused by the exposure of the valve disk 12 to the flow can be prevented from causing, and flow friction resistance caused by the increased flow velocity through the throttling thereof at a portion near the bottom of the valve disk 12 can be reduced. Furthermore, the vortex and the turbulence generated in the flow at the edge portion of the bottom of the valve disk 12 can be also prevented from causing, resulting in the reduction of the pressure loss in the main steam isolation valve, and in the reduction of turbulence generation in the flow.

FIG. 6 (6A and 6B) represents a fifth embodiment of the main steam isolation valve according to the present invention.

Figure 6A:
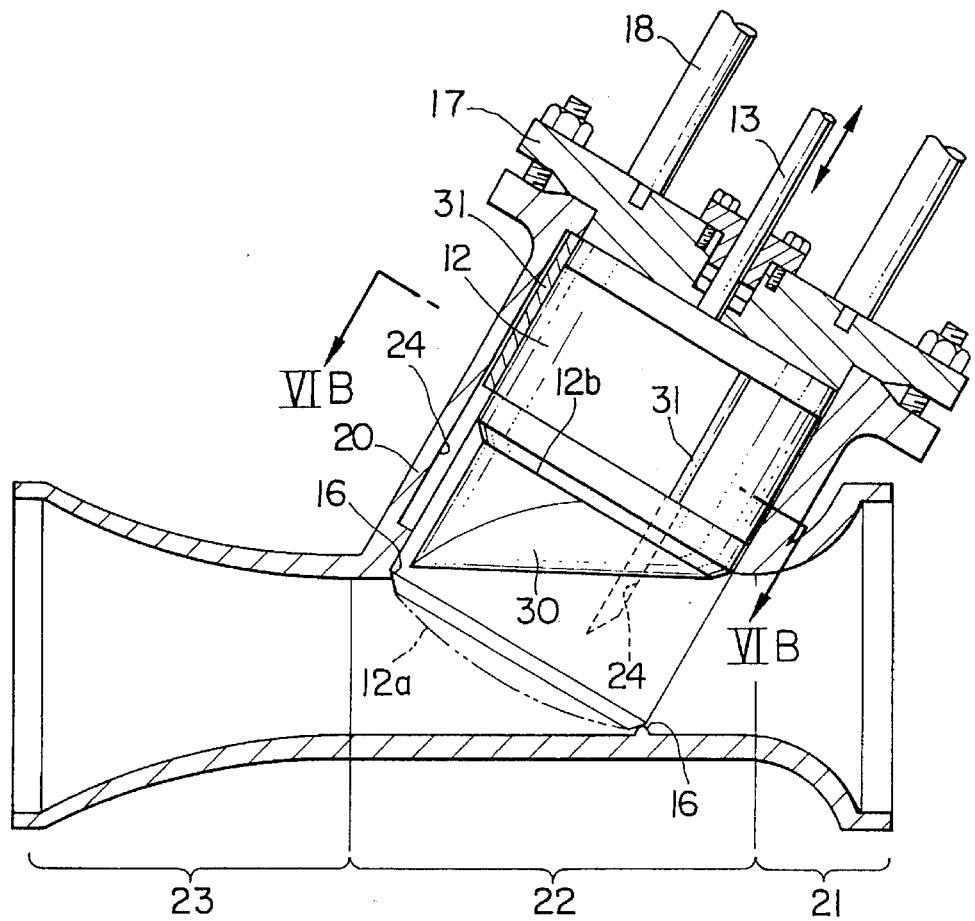
Figure 6B:
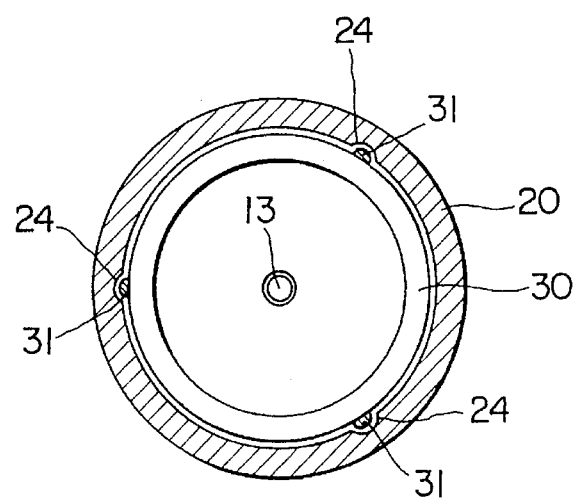

Referring to FIGS. 6A and 6B, the valve disk 12 has a bottom in an axially asymmetrical shape 30 such that a valve disk seat surface 12b can be seated on the valve seat 16 in the closed state of the valve and the valve disk 12 occupies the space existing between the elliptical flow passage of the intermediate flow passage 22 and the bottom surface of the valve disk 12 in the fully opened state of the valve.

According to this structure, since the valve disk 12 is formed asymmetrically, it is necessary to locate a valve disk positioning mechanism such as comprising a valve disk positioning grooves 24 on the side of a valve body 20 and the valve disk positioning ribs 31 on the side surface of the valve disk 12 to prevent the valve disk 12 from rotation as shown in FIG. 6B. Accordingly, the space between the elliptical passage and the bottom surface of the valve disk 12, in which the vortex generated by the circulation force from the main steam flow, is almostly pluged, thus preventing the loss of the energy of the main flow and also preventing turbulence generation in the flow, resulting in the reduction of the pressure loss in the main steam isolation valve and the reduction of causing turbulence in the flow.

FIG. 7 (7A and 7B) represents a sixth embodiment of the main steam isolation valve according to the present invention.

Figure 7A:
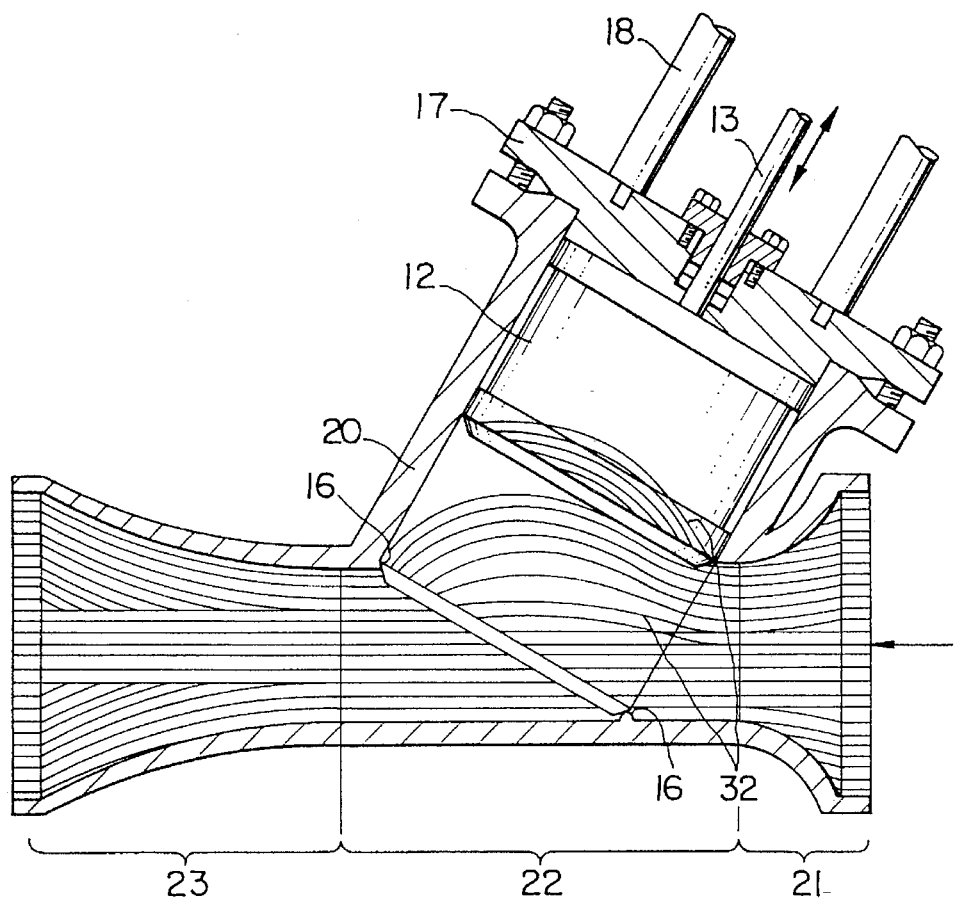
Figure 7B:
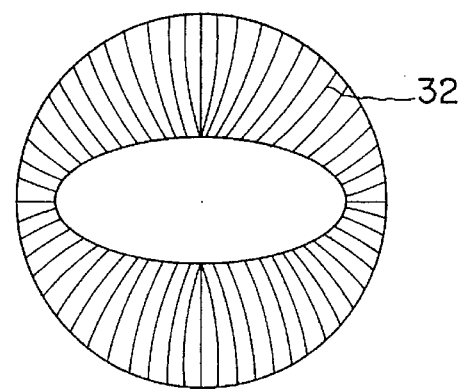

Referring to FIGS. 7A and 7B, a plurality of riblets 32 each in shape of groove are formed to the inner wall surfaces of the throttling inlet fluid passage 21, the intermediate fluid passage 22, the enlarging outlet fluid passage 23 and the outer surface of the valve disk 12, respectively. It is preferred that each grooved riblet 32 has a depth and a width substantially corresponding to the thickness of the turbulent flow boundary layer such as from 0.01 mm to 0.1 mm, preferably.

The riblets 32 have directions along the flow direction in the vicinity of the wall surface of the flow passage visualization. This flow direction will be determined through flow observation tests, in which the flow in the vicinity of the wall surface of the flow passage is visually realized by an oil-film method, for example, effected by using models of the main steam isolation valves prepared in accordance with the former embodiments. Particularly, in the former embodiments in which the steam isolation valve has an elliptical passage having a short axis directed to the reciprocating axis of the valve disk projected on a plane perpendicular to the axis of the flow passage, the flow areas on the downstream side of the throttling inlet passage 21, in the intermediate flow passage 22, at the bottom portion of the valve disk 12 and on the upstream side of the enlarging outlet passage 23 are made small, thus the flow velocities at these areas are high, so that the pressure loss due to the friction resistance between the flowing fluid and the wall surface will be high ratio to an amount being not neglected. Accordingly, the formation of the riblets 32 10 can reduce the pressure loss due to such friction resistance and the pressure loss in the main steam isolation valve can be hence reduced.

Figure 8A:
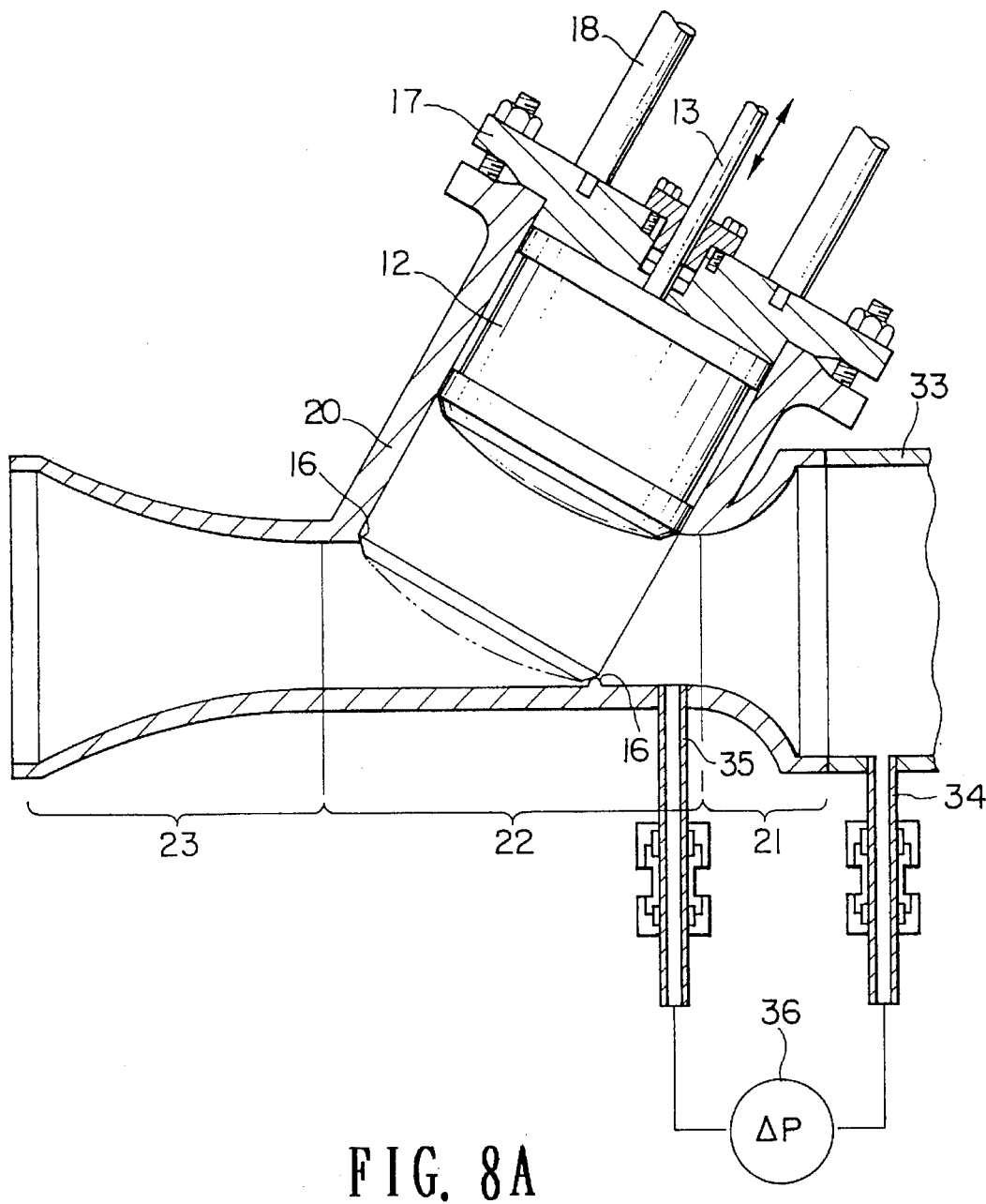
Figure 8B:
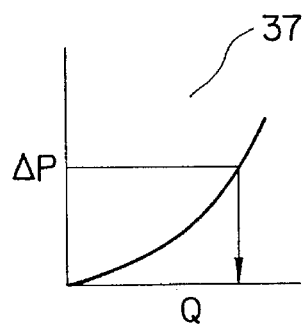

FIG. 8 (8A and 8B) represents a seventh embodiment of the main steam isolation valve according to the present invention.

The embodiment of the seventh invention basically has a structure in which a relationship of $1 < M(=L2/L1) \leq 12.5$ is established (Li: length of throttling inlet passage excluding straight tube portion and L2: length of enlarging outlet passage excluding straight tube portion), in which the valve disk is positioned outside the elliptical flow of the intermediate passage under the valve fully opened position. In which the valve disk has a spherical bottom portion, and in this embodiment, pressure taps 34 and 35 as in the Venturi flow meter are provided at a portion of an inlet pipe 33 and a portion upstream side of the valve seat in the intermediate passage 22 at which the flow area is made small, the flow velocity is higher and the pressure is lower than those in the pipe 33. A differential pressure between the taps 34 and 35 is measured by means of a differential pressure meter 36, and in using a correlation curve 37 between the flow rate (Q) and the differential pressure ($\Delta P$), which is obtained in advance, the steam flow rate of the main steam line is calculated. In an alternation, a plurality of each of the pressure taps 34 and 35 may be provided at the same positions on the piping axis.

Figure 13:
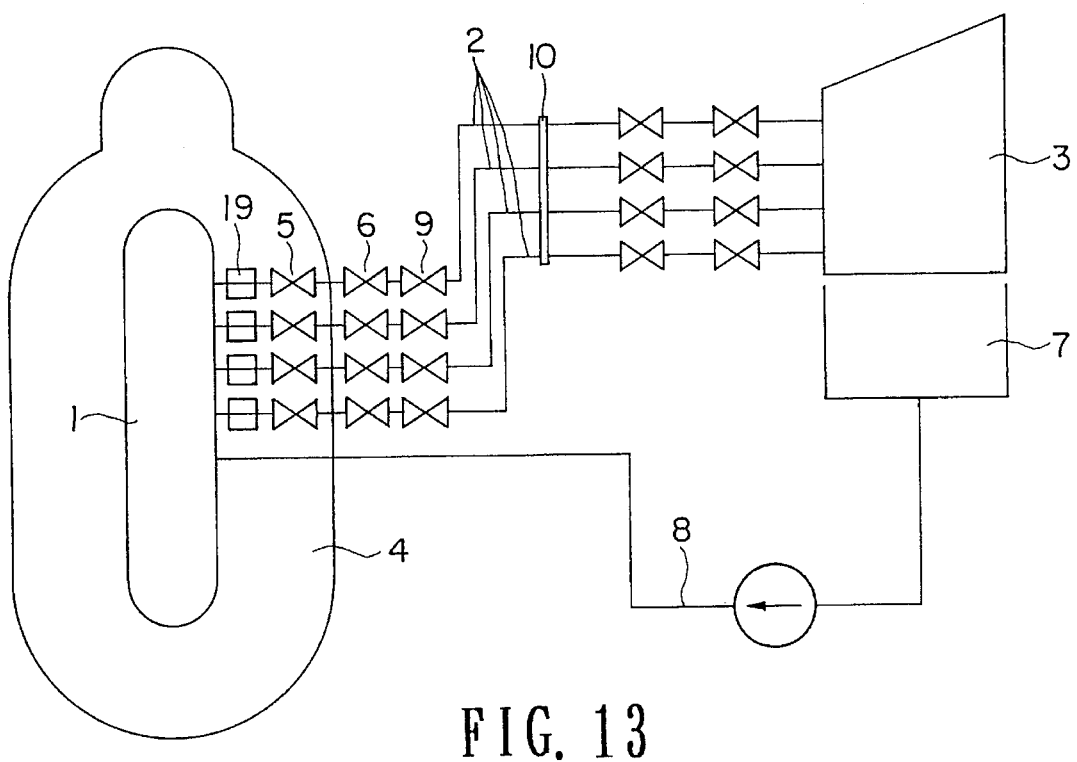
FIG. 13 is a view showing a system line arrangement of in a turbine system of a boiling water reactor power plant.

According to this structure, the main steam isolation valve of the seventh embodiment is provided with a function as a flow rate measuring element, and hence, a Venturi tube 19, which is disposed on a way of the main steam line 2 of the conventional example of FIG. 13, can be eliminated. As a result, the pressure loss which may be caused in the main steam line connecting the reactor pressure vessel 1 and the steam turbine 3 can be reduced. Thus, the loss of the hydrodynamic energy transferring ability (pressure head) with respect to the steam turbine can be reduced by the amount corresponding to the reduced pressure loss, thus improving the plant operational efficiency.

Figure 9A:
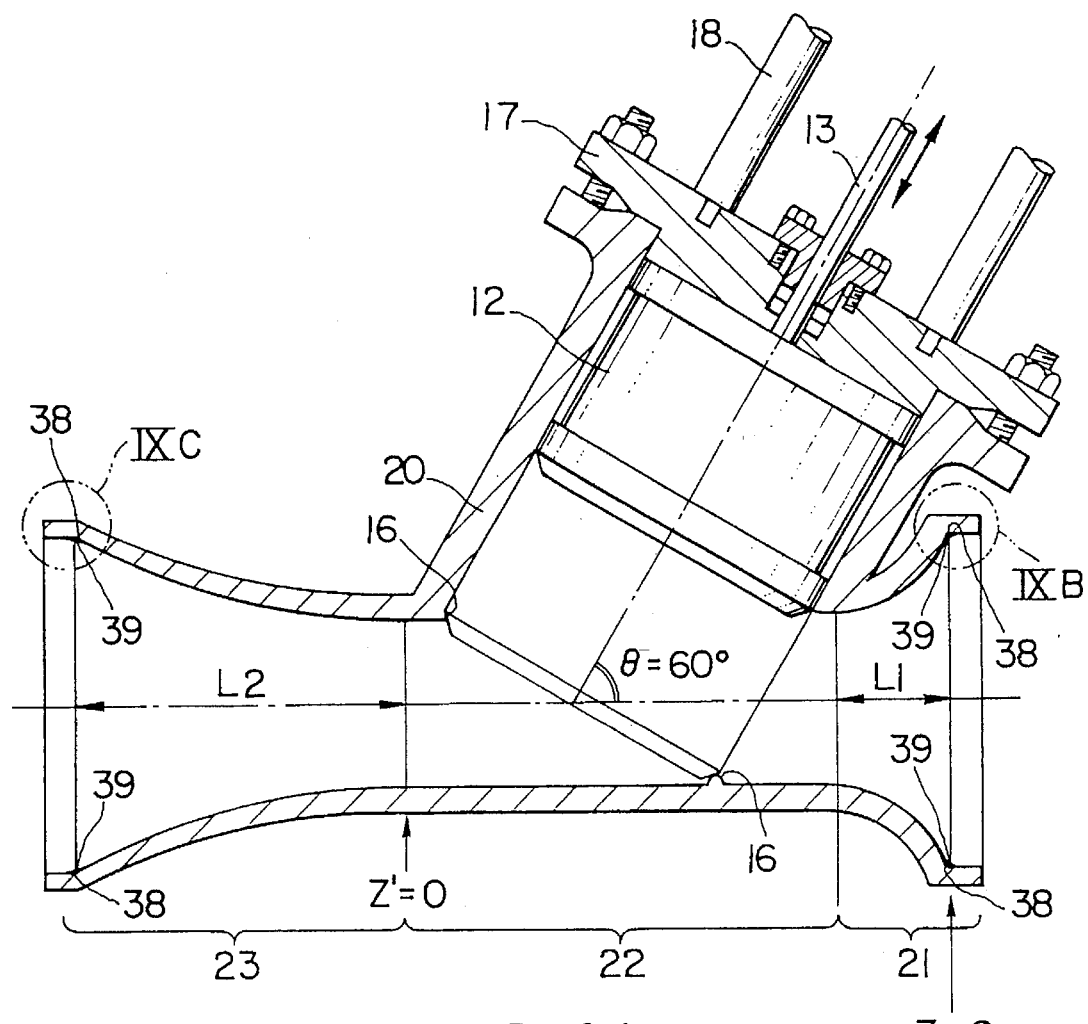
Figure 9C:
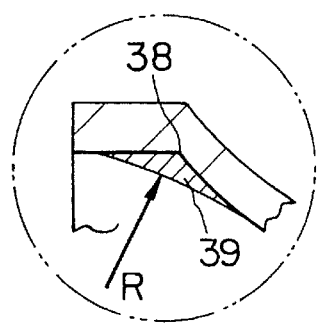
Figure 9B:
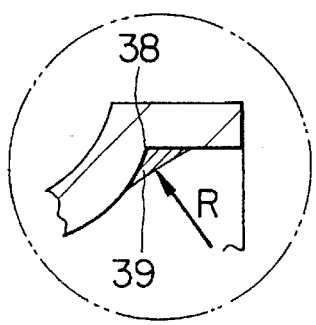

FIG. 9 (9A, 9B and 9C) represents an eighth embodiment of the main steam isolation valve according to the present invention.

In this embodiment, a further structural feature is added to the former embodiments, respectively, such that curved surfaces 39 (9B and 9C) at corner portions 38 of the start portion B of the throttling inlet passage 21 and the end portion C of the enlarging outlet portion 23 of the main steam line are formed. According to the formation of such curved surfaces 39, the fluid, i.e. steam can flow more smoothly.

Figure 10A:
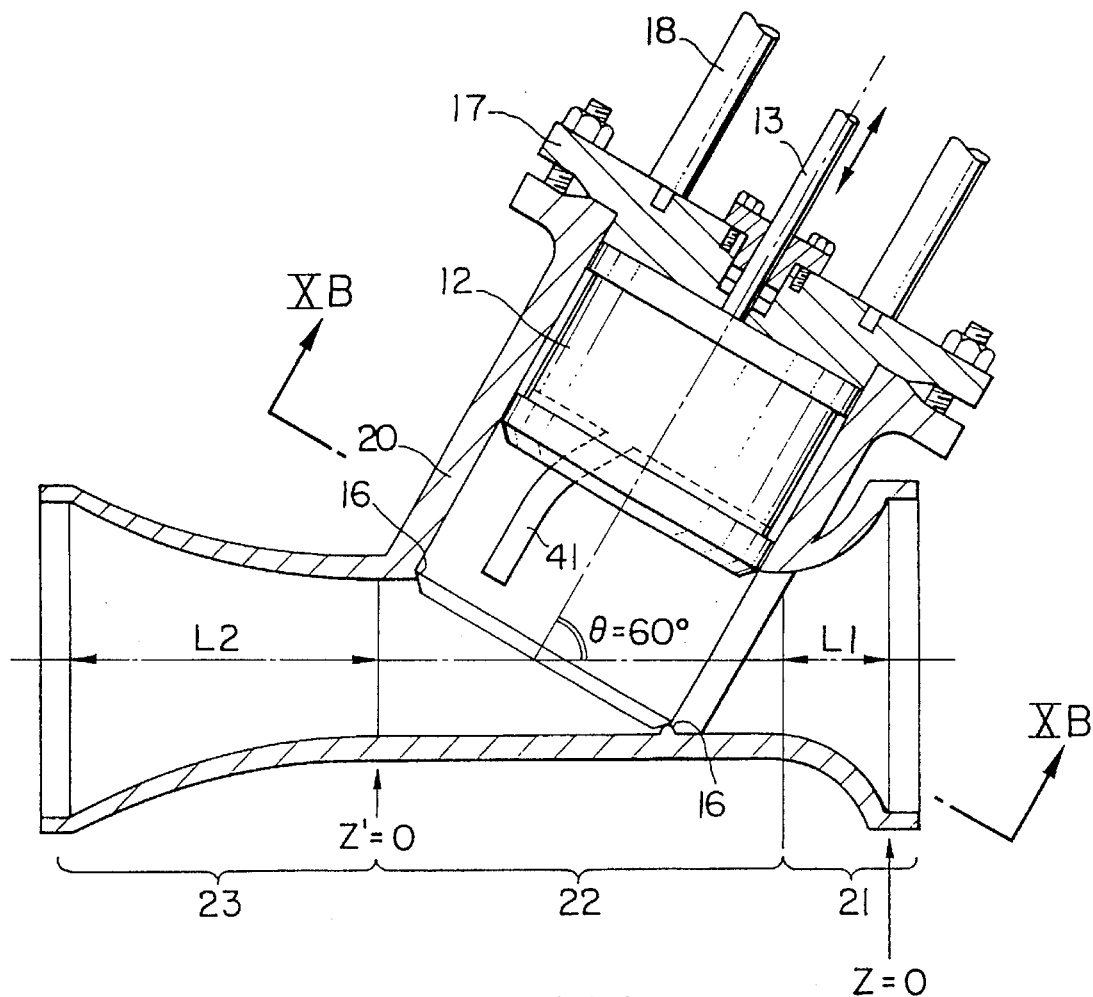
Figure 10B:
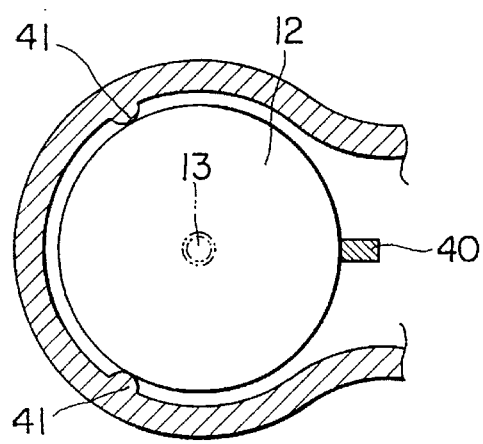

FIG. 10 (10A and 10B) represents a ninth embodiment of the main steam isolation valve according to the present invention.

In this embodiment, a further structural feature is added to the former embodiments, respectively, such that an inlet guide rib 40 and a pair of side guide ribs 41 are provided for the valve disk 12 so as to extend along the axial direction of the valve disk 12. According to this structure, the reciprocating motion of the valve disk along its axial direction can be easily guided.

Figure 11A:
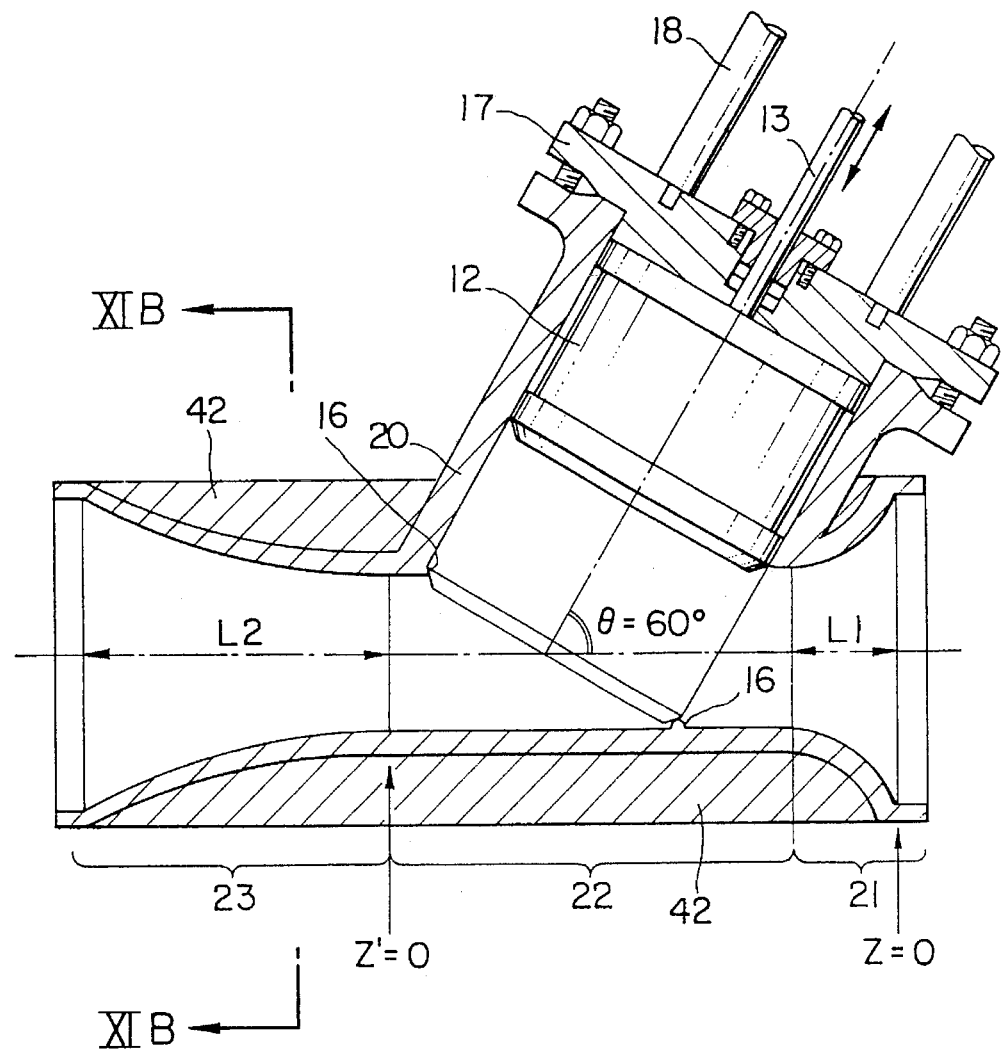

FIG. 11 (11A and 11B) represents a tenth embodiment of the main steam isolation valve according to the present invention.

Figure 11B:
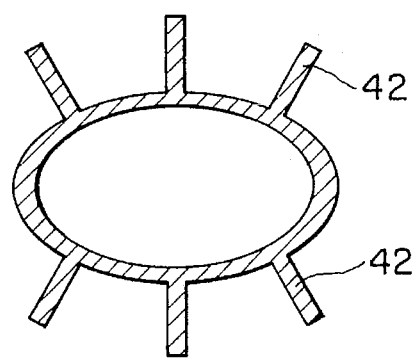

In this embodiment, a further structural feature is added to the former embodiments, respectively, such that a plurality of reinforcing ribs 42 are formed to the outer surface of the elliptical flow passage wall at portions corresponding to the throttling inlet passage 21 in a fashion as shown in FIG. 11B, for example, the intermediate passage 22 and the enlarging outlet passage 23. According to this structure, the deformation of the valve seat due to the thermal deformation and reaction force from the piping system can be effectively prevented.

Figure 12:
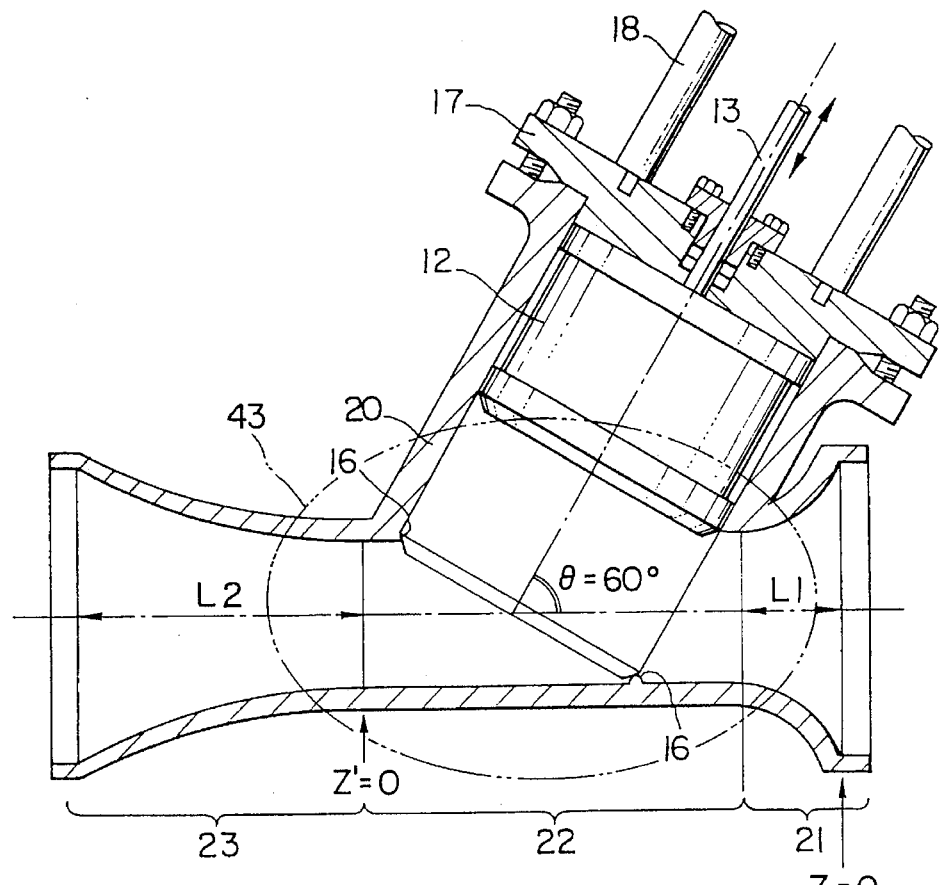
FIG. 12 is a sectional view similar to that of FIG. 1A of an eleventh embodiment of a steam isolation valve according to the present invention.

FIG. 12 represents an eleventh embodiment of the main steam isolation valve according to the present invention.

In this embodiment, a further structural feature is added to the former embodiments, respectively, such that thickened portions 43 are formed to a valve disk accommodation portion of the valve body 20 and a portion of the valve body 20 surrounding the valve seat 16 at the throttling inlet passage 21 and the intermediate passage 22. According to this structure, the deformation of the valve seat due to the thermal deformation and reaction force from the piping system can be effectively prevented, and leak from the valve seat 16 can be also prevented, thus being effective.

The present invention is not limited to the respective embodiments described hereinbefore and many other changes or modifications may be made without departing from the scopes of the appended claims, and for example, many preferred combinations of the respective embodiments will be also within the scope of the present invention.

What is claimed is:

1. A steam isolation valve system comprising:

a steam flow passage;

a valve body connected to the steam flow passage at an angle θ;

a valve disk accommodated in the valve body so as to carry out a reciprocal motion in the valve body for opening and closing the steam flow passage; and a drive means for reciprocatingly moving the valve disk along an axial direction of the valve body, wherein the steam flow passage has a portion having an elliptical section and having a short axis in a direction of a projection of a reciprocating axis of the valve disk on a plane perpendicular to an axis of the steam flow passage;

wherein the steam flow passage has a throttling inlet passage portion which is deformed in shape from a substantially circular tube portion having a diameter D on a steam upstream side to an elliptical tube portion having a long side diameter D and a short side diameter D cosθ (45°≦θ≦65°) on a steam downstream side, an intermediate passage portion which has an elliptical shape of the same diameters as that of the elliptical tube portion on the steam downstream side of the inlet passage portion, and an enlarging outlet passage portion which is deformed in shape from an elliptical tube portion having the same diameters as that of the elliptical tube portion of the intermediate passage portion at a steam upstream side to a substantially circular portion having a diameter D at a steam downstream side.

2. A steam isolation valve system according to claim 1, wherein a ratio (M) of a tube length (L2) of the enlarging outlet passage portion, excluding a straight tube portion of the enlarging outlet passage portion, with respect to a tube length (L1) of the throttling inlet passage portion, excluding a straight tube portion of the throttling inlet passage portion, is within a range of 1<M≦12.5.

3. A steam isolation valve system according to claim 1, wherein said enlarging outlet passage portion has an inner surface shape satisfying an equation of $d(w^2)/dz=c$, in which w is a velocity in an axial direction of the enlarging outlet passage portion averaged at the cross section, z is a positional coordinate in the axial direction and c is constant.

4. A steam isolation valve system according to claim 1, wherein said throttling inlet passage portion has an inner surface shape satisfying an equation of $d(w^2)/dz=c$, in which w is a velocity in an axial direction of the throttling inlet passage portion averaged at the cross section, z is a positional coordinate in the axial direction and c is constant.

5. A steam isolation valve system according to claim 1, wherein said steam flow passage includes a flow return passage having one end opened to a downstream side end of the intermediate flow passage portion and another end opened to a portion in the enlarging outlet passage portion at which the steam flow is separated from the wall.

6. A steam isolation valve system according to claim 1, wherein a plurality of circumferential grooves are formed in an inner surface of a tube wall constituting the enlarging outlet passage portion, each of said grooves having a depth in a radial direction of the steam flow passage and a length extending in a circumferential direction of the elliptical inner surface of the tube wall.

7. A steam isolation valve system according to claim 1, wherein said valve disk is positioned entirely outside the intermediate passage portion when the steam isolation valve system is in a fully opened state.

8. A steam isolation valve system according to claim 1, wherein a plurality of grooves are formed in inner wall surfaces of the throttling inlet passage portion, the intermediate passage portion, the enlarging outlet passage portion and an outer surface of the valve disk, respectively, each of the grooves having a depth and a width substantially corresponding to a thickness of a turbulent flow boundary layer and extending along a steam flow flowing in a vicinity of each of the wall surfaces.

9. A steam isolation valve system according to claim 1, wherein said steam flow passage includes an inlet duct portion, the system further comprising a differential pressure meter located between the inlet duct portion and an upstream portion of the valve seat in the intermediate passage portion.

10. A steam isolation valve system according to claim 1, wherein wall structures constituting a corner portion at a start portion of the throttling inlet passage portion and a corner portion at an end portion of the enlarging outlet passage portion have smooth curved surfaces, respectively.

11. A steam isolation valve system according to claim 1, wherein a guide rib is provided in an inlet portion of said intermediate passage portion and a pair of side ribs are provided in the valve body so as to extend axially thereof.

12. A steam isolation valve system according to claim 1, wherein a reinforcing rib is formed in an outer surface of the valve body corresponding to the throttling inlet passage portion, the intermediate passage portion and the enlarging outlet passage portion.

13. A steam isolation valve system according to claim 1, wherein said valve disk has a bottom portion of a protruded spherical shape.

14. A steam isolation valve system according to claim 1, wherein said valve disk has a bottom portion having an axially asymmetric structure occupying a space between the elliptical section portion and the bottom portion of the valve disk in a valve fully opened state.

15. A steam isolation valve system according to claim 1, wherein said valve body has a thickness capable of preventing a valve seat from being thermally deformed and deformed by reaction force of the piping system.

* * * * *